Dec. 12, 1944.  G. J. MEYER  2,365,093
CLUTCH
Filed Dec. 11, 1942

INVENTOR
GEORGE J. MEYER
BY Christopher L. Waal
ATTORNEY

Patented Dec. 12, 1944

2,365,093

UNITED STATES PATENT OFFICE 2,365,093

CLUTCH

George J. Meyer, Milwaukee, Wis.

Application December 11, 1942, Serial No. 468,663

6 Claims. (Cl. 192—25)

The present invention relates to clutches adapted for use in various machines, but particularly suitable for punch presses.

An object of the invention is to provide an improved pin-type clutch which is so arranged as to facilitate actuation and to minimize lateral pressure on slidable clutch parts during the movement thereof, which is capable of withstanding heavy shocks or jars, and which is reliable in operation.

Another object is to provide a clutch which is of simple, rugged and long-wearing construction and which is relatively compact in its axial dimension.

A further object is to provide a pin-type clutch having improved means for mounting and actuating a plurality of clutch pins.

The invention further consists in the several features hereinafter described and claimed.

Figure 1:
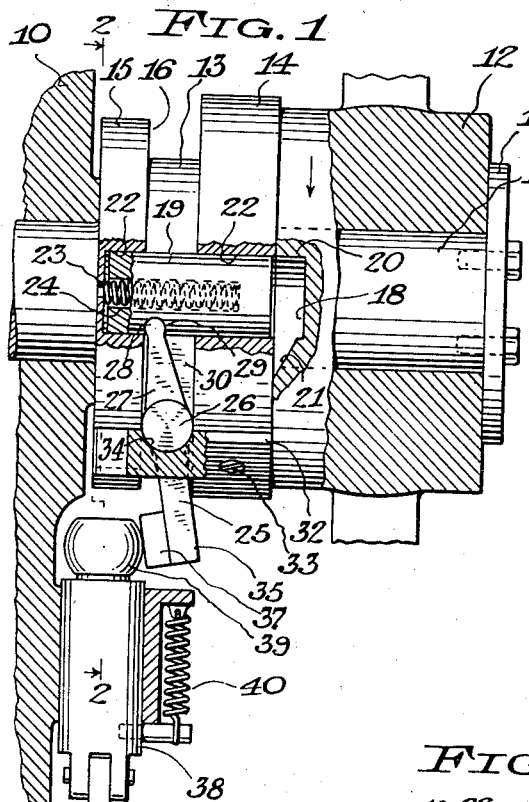
Figure 2:
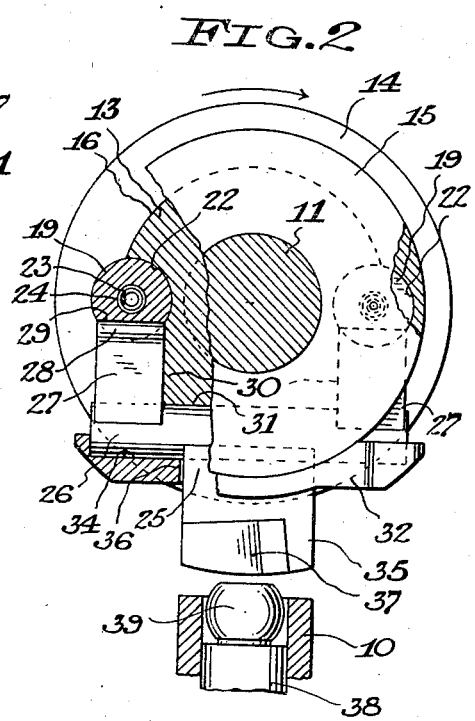
Figure 3:
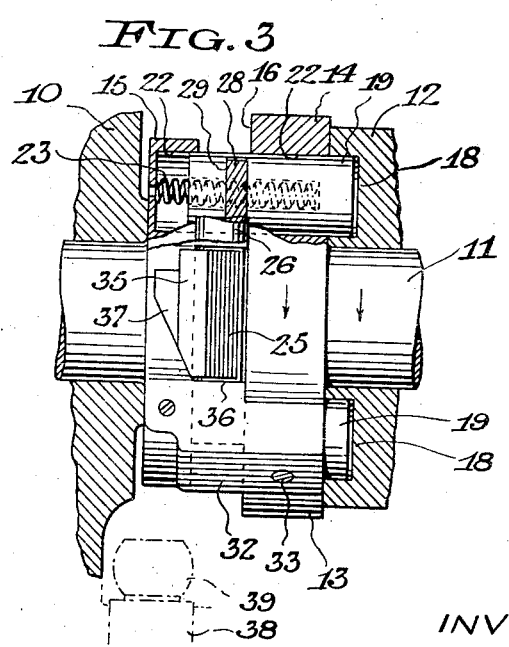

In the accompanying drawing, illustrating one form of clutch embodying the invention, Fig. 1 is a side elevation of the clutch, parts being broken away and parts being shown in section, the clutch being in disengaged position;

Fig. 2 is a sectional elevation taken generally along the line 2—2 of Fig. 1, but showing a clutch trip in clutch-engaging position, and Fig. 3 is a side elevation of the clutch in its engaged position, parts being broken away and parts being shown in section, and the rotating parts being at right angles to the position shown in Fig. 1.

In the drawing, 10 designates the frame of a punch press of any usual type. A horizontal crank shaft 11 for the press is journalled in the frame and has a driving wheel 12, such as a motor-operated pulley, fly wheel or gear, mounted on the outer end of the shaft, the wheel being normally free to rotate on the shaft. A short annular enlargement or collar 13 is formed on the shaft between the frame and the wheel and is provided with axially spaced annular flanges 14 and 15 which define an intervening groove 16. The hub of the wheel is confined between the collar 13 and a suitable retaining member 17 which is detachably secured to the outer end of the shaft.

The face of the wheel hub adjacent to the shaft collar 13 is provided with one or more pairs of recesses 18 adapted to receive the ends of a pair of shiftable clutch pins or dogs 19, the recesses presenting driving abutments or shoulders 20 laterally engageable with the pins. Suitable provision is made for facilitating the projection of the pins into the recesses, as by forming the recesses with beveled entrance portions 21. The two clutch pins 19, which are preferably formed of hardened steel, are slidably mounted in respective bores 22 formed in the shaft collar 13, and extend in parallel relation to the shaft axis and at opposite sides of the shaft axis, the pins being equidistant from this axis. Each pin is urged in clutching direction by a compressed coiled spring 23 which extends in a central bore 24 formed in the pin and bears against the closed end of the collar bore 22. Preferably, the clutch pins are round, as shown, but they are not necessarily of this form.

The clutch pins 19 are retractable from clutching position by a forked clutch lever 25 which is mounted on and rotatable with the crank shaft 11. The clutch lever has a shaft portion 26 with its axis extending transversely of the shaft collar 13 and parallel to the axial plane of the pins, and has axially spaced arms 27 interengageable with the respective pins, each arm having a cylindrically rounded end 28 fitting in a transverse notch 29 formed in the side wall of the associated pin. The groove 16 in the shaft collar exposes the intermediate portion of each pin and includes recesses 30 at opposite sides to accommodate the clutch lever arms 27. The shaft portion 26 of the clutch lever, which fits between the collar flanges 14 and 15, is rockably seated in a bearing groove 31 formed in the collar and is retained therein by a bearing member 32 detachably secured to the collar flanges, as by screws 33, the bearing member having a bearing groove 34 to receive the shaft portion. The forked clutch lever 25 has a central outwardly projecting arm 35 which extends through an opening 36 formed in the bearing member 32 and is provided at the side toward the punch press frame with a cam portion 37.

In order to actuate the clutch lever to the disengaging position seen in Fig. 1 the cam portion 37 of the lever cooperates with a shiftable trip or abutment which may be of various types, but is here shown to comprise a plunger 38 slidably mounted on the machine frame and extending in a radial direction with respect to the crank shaft, the plunger having a roller 39 at its upper end engageable with the cam face of clutch lever 25. The trip is urged upwardly to clutch-disengaging position by a spring 40, and is movable downwardly out of engagement with the clutch lever, as by means of a link 41 and treadle 42, the trip operating mechanism being of any usual type. If desired, the shiftable trip may be gravitationally urged to clutch-disengaging position, as by merely inverting the trip and arranging it above the crank shaft.

In operation, the driving wheel 12 rotates continuously in the direction indicated by arrows and in the position of the mechanism shown in Fig. 1 the clutch is disengaged and the crank shaft is at rest. To actuate the clutch the trip plunger 38 is urged downwardly by the treadle to the position shown in Fig. 2, permitting the clutch pins 19 to move toward clutching position under the urge of their springs 23, the clutch lever 25 being swung by the pins in a clockwise direction from the position shown in Fig. 1. As soon as the wheel recesses 18 reach a position opposite the clutch pins, the pins enter the recesses and laterally engage the walls 20 thereof, thus transmitting driving torque to the crank shaft. Normally, the trip plunger 38 is restored to the clutch-disengaging position of Fig. 1 before the crank shaft is turned through one revolution by the driving wheel, so that as the clutch lever again approaches the trip roller 39 the cam arm 35 of the lever will engage the roller and be angularly displaced to the position of Fig. 1, thus withdrawing the clutch pins from the driving wheel. The crank shaft thereupon comes to a stop in readiness for the next cycle of operation. If desired, the punch press may be provided with the usual brake, not shown, for insuring prompt stopping of the crank shaft when the clutch is disengaged. Also, if desired, the trip mechanism may be of any well known non-repeat type so that even if the treadle is held down for a time the crank shaft will not turn through more than one revolution, a separate treadle operation being required for each press operation.

The distance between the axis of each clutch pin and the lateral notch 29 in the pin is relatively short compared with the length of the pin, thus practically eliminating side thrust on the pin or cocking of the pin incident to pressure between the walls of the notch and the lever arm 27, and permitting easy and quick movement of the pin. The clutch lever 25 mounted on the crank shaft also has a smooth and easy movement, as well as possessing a low inertia, thus insuring reliable operation in a high-speed press. Each clutch pin has its own spring which acts axially and centrally of the pin, thus insuring quick shifting of the pin in clutching direction without danger of binding, and even if one spring should fail the other spring will act on both pins by reason of the armed clutch lever which synchronizes the movement of the pins. The simultaneously actuated clutch pins at opposite sides of the crank shaft axis not only present extensive long-wearing torque-transmitting surfaces but also serve to minimize and equalize wear on the bearing surfaces between the crank shaft and the rotary driving member. The cam 37 and cooperating roller 39 are here shown to be carried on the clutch lever and trip, respectively, but it will be obvious that this relation may be reversed. The crank shaft collar 13, which carries the slidable clutch pins 19 and the clutch lever 25, is relatively short, thus permitting the driving wheel on the shaft to be brought reasonably close to the frame of the machine,

What I claim as new and desire to secure by Letters Patent is:

1. In a clutch, the combination of a rotatable driven shaft having a collar portion with pin-guiding holes extending parallel to the shaft axis and arranged at diametrically opposite sides of said axis and at equal distances from said axis, a driving member rotatably mounted on said shaft and having pin-engaging abutments, clutch pins slidable in said holes and engageable with said abutments for transmitting driving torque to said shaft, each pin having a lateral notch, compressed coiled springs extending axially of said respective pins for moving said pins in clutching direction, a shift lever pivotally carried by and rotatable with said shaft and having its pivotal axis extending transversely of the shaft axis and parallel to the plane of the axes of the pins, said lever having a pair of arms at opposite sides of said shaft engageable in the notches of the pins for moving said clutch pins out of clutching position and having another arm projecting outwardly from said shaft, and a shiftably mounted trip engageable by said last-named lever arm during the rotational travel of said lever for moving said lever to clutch-disengaging position and releasable from said lever arm to permit movement of the clutch pins to clutching position.

2. In a clutch, the combination of a rotatable driven shaft member having a collar portion, a rotatable driving member coaxial therewith, clutch pins carried for axial sliding movement in said collar portion at a distance from the axis of said shaft member and shiftable into engagement with said driving member for connecting said driving and driven members, said clutch pins being symmetrically arranged with respect to the axis of said driven shaft member, and means for actuating said clutch pins comprising a shift lever carried by and rotatable with said driven member, the axis of said lever extending transversely of the axis of said driven member, and said lever having arms at opposite sides of said driven member operatively connected to said clutch pins.

3. In a clutch, the combination of a rotatable driving member, a rotatable driven member coaxial therewith, a pair of clutch pins carried for axial sliding movement in said driven member and shiftable into engagement with said driving member for connecting said driving and driven members, said clutch pins being arranged at opposite sides of the axis of said driven member and at equal distances from the axis of said driven member, and means for simultaneously actuating said clutch pins comprising a shift lever carried by and rotatable with said driven member, the axis of said lever extending transversely of the axis of said driven member and parallel to the plane of the pin axes, and said lever having arms at opposite sides of said driven member interengageable with said pins.

4. In a clutch, the combination of a rotatable driving member, a rotatable driven member coaxial therewith, clutch pins carried for axial sliding movement in said driven member and shiftable into engagement with said driving member for connecting said driving and driven members, said pins being symmetrically arranged with respect to the axis of said driven member, spring means for urging said clutch pins in clutching direction, and means interengageable with said clutch pins for actuating said pins in disengaging direction and comprising a shift lever carried by and rotatable with said driven member, said lever having its axis transverse to the driven member axis and having pin-shifting arms arranged at opposite sides of said driven member.

5. In a clutch, the combination of a rotatable driving member, a rotatable driven member coaxial therewith, a pair of clutch pins carried for axial sliding movement in said driven member and shiftable into engagement with said driving member for connecting said driving and driven members, said clutch pins being arranged at diametrically opposite sides of the axis of said driven member and at equal distances from the axis of said driven member, and means for actuating said clutch pins comprising a shift lever carried by and rotatable with said driven member, the axis of said lever extending transversely of the axis of said driven member and parallel to the plane of said pins, and said lever having arms at opposite sides of said driven member respectively bearing on said pins for longitudinally displacing said pins.

6. In a clutch, the combination of a rotatable driving member, a rotatable driven member coaxial therewith, a pair of clutch pins carried for axial sliding movement in said driven member and shiftable into engagement with said driving member for connecting said driving and driven members, said clutch pins being arranged at diametrically opposite sides of the axis of said driven member and at equal distances from said axis, spring means for urging said clutch pins in clutching direction, and means for simultaneously actuating said clutch pins in disengaging direction comprising an armed shaft rockably carried by and rotatable with said driven member, the axis of said shaft extending transversely of the axis of said driven member and parallel to the axial plane of said pins, said driven member having bearing means in which said shaft is rockably seated, and said shaft having a pair of arms at opposite ends interengageable with said respective pins.

GEORGE J. MEYER.